(12) United States Patent
Hou

(10) Patent No.: US 10,802,906 B2
(45) Date of Patent: Oct. 13, 2020

(54) MONITORING METHOD AND APPARATUS OF SERVER, AND STORAGE MEDIUM

(71) Applicant: TENCENT TECHNOLOGY (SHENZHEN) COMPANY LIMITED, Shenzhen (CN)

(72) Inventor: Kunming Hou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 9 days.

(21) Appl. No.: 16/281,869

(22) Filed: Feb. 21, 2019

(65) Prior Publication Data

US 2019/0179726 A1 Jun. 13, 2019

Related U.S. Application Data

(63) Continuation of application No. PCT/CN2017/111531, filed on Nov. 17, 2017.

(30) Foreign Application Priority Data

Dec. 8, 2016 (CN) .......................... 2016 1 1123831

(51) Int. Cl.
G06F 11/07 (2006.01)
G06F 11/34 (2006.01)
(Continued)

(52) U.S. Cl.
CPC ........ *G06F 11/0793* (2013.01); *G06F 11/302* (2013.01); *G06F 11/3006* (2013.01);
(Continued)

(58) Field of Classification Search
CPC ............. G06F 11/0715; G06F 11/0793; G06F 11/0703; G06F 11/14; H04L 67/1002;
(Continued)

(56) References Cited

U.S. PATENT DOCUMENTS

| 7,733,774 B1 | 6/2010 | Sasidharan et al. |
| 9,183,068 B1 * | 11/2015 | Shum .................. G06F 11/0793 |

(Continued)

FOREIGN PATENT DOCUMENTS

| CN | 101729567 A | 6/2010 |
| CN | 102063360 A | 5/2011 |

(Continued)

OTHER PUBLICATIONS

The State Intellectual Property Office of the People's Republic of China (SIPO) Office Action 1 for 201611123831.3 dated Sep. 18, 2019 7 Pages (including translation).

(Continued)

*Primary Examiner* — Kyung H Shin

(74) *Attorney, Agent, or Firm* — Anova Law Group, PLLC

(57) ABSTRACT

A monitoring method of a server is provided. The server starts a target monitoring process of a client, and monitors, after the server starts the target monitoring process, whether the target monitoring process exceptionally exits. Further, the server sends, to a preset terminal when the server detects that the target monitoring process exceptionally exits, alarm information used to indicate that the target monitoring process exceptionally exits, where the preset terminal sends an operation and maintenance instruction to the server according to the alarm information. The server also maintains the target monitoring process according to the operation and maintenance instruction.

20 Claims, 8 Drawing Sheets

(51) Int. Cl.
*H04L 12/26* (2006.01)
*G06F 11/30* (2006.01)
*G06F 11/32* (2006.01)
*G06F 8/60* (2018.01)

(52) U.S. Cl.
CPC ........ *G06F 11/327* (2013.01); *G06F 11/3495* (2013.01); *H04L 43/045* (2013.01); *H04L 43/0805* (2013.01); *H04L 43/0876* (2013.01); *H04L 43/50* (2013.01); *G06F 8/60* (2013.01)

(58) Field of Classification Search
CPC ............. H04L 67/1014; H04L 67/1008; H04L 67/2885
See application file for complete search history.

(56) References Cited

U.S. PATENT DOCUMENTS

2010/0128598 A1* 5/2010 Gandhewar ......... H04L 67/1002
370/217
2011/0167491 A1 7/2011 Ruggerio

FOREIGN PATENT DOCUMENTS

| CN | 102591765 A | 7/2012 |
| CN | 102694871 A | 9/2012 |
| CN | 104391777 A | 3/2015 |
| CN | 105512027 A | 4/2016 |
| CN | 106844137 A | 6/2017 |

OTHER PUBLICATIONS

The World Intellectual Property Organization (WIPO) International Search Report for PCT/CN2017/111531, dated Feb. 22, 2018 6 Pages (including translation).

* cited by examiner

| | | | | | |
|---|---|---|---|---|---|
| Start | Machine selection: | | Application selection: | | |
| Brief introduction | IP | Displayed information: | Status | CPU running status | Memory usage |
| Monitoring | 10.251.71.150 | 14246,14256 | Normal | | |
| Instance running monitoring | 10.251.64.7 | 25938,25948,25 958,25968 | Normal | | |
| Instance log | 10.250.100.183 | 18145,18155 | Normal | | |
| | 10.251.196.13 | 25616,25626,25636, 25646,25656,25666,2... | Normal | | |

FIG. 9

| | | | | | |
|---|---|---|---|---|---|
| Restarting | Machine selection: external network-Guangzhou-10.251.71.150 | | Application selection: | | |
| Brief introduction | Log | Size | Creation time | Update time | Operation |
| Monitoring | tdsql.log.2016 -09-19 | 146.98k | 2016-09-19T11:07:07.... | 2016-09-19T11:07:07 | Download |
| Instance running monitoring | tdsql.log.2016 -09-18 | 434.32k | 2016-09-18T11:37:59.... | 2016-09-18T11:37:59.... | Download |
| Instance log | tdsql.log.2016 -09-17 | 1.66k | 2016-09-17T05:42:20.... | 2016-09-17T05:42:20.... | Download |
| Resource | tdsql.log.2016 -09-16 | 1.66k | 2016-09-16T15:30:21.... | 2016-09-16T15:30:21.... | Download |
| | tdsql.log.2016 -09-14 | 246.07k | 2016-09-14T10:14:13.... | 2016-09-14T10:14:13.... | Download |
| | tdsql.log.2016 -09-13 | 9.91k | 2016-09-13T13:21:38.... | 2016-09-13T13:21:38.... | Download |

FIG. 10

| Overview | Cloud product ⌄ | Cloud database | Cloud storage | Cloud cache | Memcached | Cloud data ⚙ | | Cloud storage... ⌄ | Help⌄ | Work order | ✉750 | ⏲ |

| | | | | | | | | | |
|---|---|---|---|---|---|---|---|---|---|
| Cloud database « | Default item ⌄ | Southern China (Guangzhou) ⌄ | | | | | | | |
| | +Create | More operations ⌄ | | | | | Enter an instance name | 🔍 | |
| Database ⌄ Database management ⌄ system | ☐ | ID/instance name | Running status | Specification | Home network | Internal IP address | Expiration time | Operation | |
| | ☐ | tdsql-ci1qObo4 tdsql10365... | Running | Memory of 3 G, and storage space of 50 G | Basic network | 10.66.149.45:3306 | 2016-10-... | Management\| upgrade | |
| ○ Instance list ● Task list ● Parameter template ● Operation log ● Database audit ● Data transmission ● Database synchronization | ☐ | tdsql-f13vpzmc tdsql10362 | Not initialized | Memory of 3 G, and storage space of 50 G | Basic network | 10.66.185.38:3306 | 2016-11-0... | Management\| upgrade initialization | |
| | ☐ | tdsql-3asfgoBl tdsql10363 | Running | Memory of 6 G, and storage space of 100 G | Basic network | 10.66.185.4:3306 | 2016-10-... | Management\| upgrade | |
| | ☐ | tdsql-8d1rwcfm tdsql10360 | Not initialized | Memory of 6 G, and storage space of 100 G | Basic network | 10.66.147.13:3306 | 2016-10-... | Management\| upgrade initialization | |
| Database management ⌄ system | ☐ | tdsql-b4f33anq [Continue] tdsql10359 | Migrating | Memory of 6 G, and storage space of 100 G | Basic network | 10.66.140.189:3306 | 2016-10-... | Management\| upgrade | |
| | 0 items are selected, 8 items in total | | | | | Rows displayed on each page  20 ▼ | ⟨ ⟨ 1/1▼ ⟩ ⟩ | | |

FIG. 11

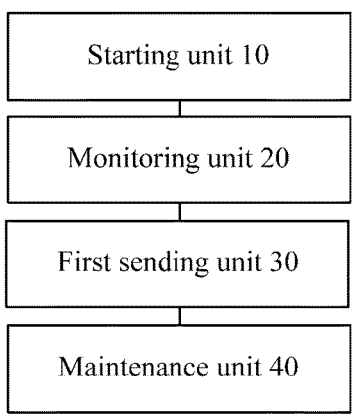

MONITORING METHOD AND APPARATUS OF SERVER, AND STORAGE MEDIUM

RELATED APPLICATIONS

This application is a continuation application of PCT Patent Application No. PCT/CN2017/111531, filed on Nov. 17, 2017, which claims priority to Chinese Patent Application No. 2016111238313, filed with the Chinese Patent Office on Dec. 8, 2016 and entitled "MONITORING METHOD AND APPARATUS OF SERVER", which is incorporated herein by reference in its entirety.

FIELD OF TECHNOLOGY

Embodiments of the present invention relate to the field of computer technologies and, specifically, to a monitoring method and apparatus for a server, and a storage medium.

BACKGROUND

Currently, a main method for a server to monitor clients is that multiple clients (APP) are independently developed and independently deployed, and each has a running environment. FIG. 1 is a schematic diagram of a running environment of a client in a related technology.

As shown in FIG. 1, an APP 1 to a new APP are independently developed and independently deployed, and each has a running environment. For example, the APP 1 includes a node server, a common gateway interface (CGI), a programming language script (PAGE), a model, a tool (Utils), a request proxy, and a process manager (Process Mgr). The same running environment is deployed on each of the APP 2 to the new APP. Consequently, coupling between the client and an entire service system is low, and there is no unified running environment and no unified dependency environment, and there are no unified operation and maintenance deployment or service running monitoring functions, leading to low monitoring availability of the server.

In addition, when the server monitors a client, monitoring on the client is not combined with alarm information of a target monitoring process. Consequently, no closed loop is formed to further control the target monitoring process, leading to low monitoring stability and low monitoring performance of the server, and low monitoring availability of the server.

The disclosed methods and systems are directed to solve one or more problems set forth above and other problems.

SUMMARY

Embodiments of the present invention provide a monitoring method and apparatus of a server, and a storage medium, to resolve at least a technical problem of low monitoring availability of a server in a related technology.

According to an aspect of the embodiments of the present invention, a monitoring method of a server is provided. The server starts a target monitoring process of a client, and monitors, after the server starts the target monitoring process, whether the target monitoring process exceptionally exits. Further, the server sends, to a preset terminal when the server detects that the target monitoring process exceptionally exits, alarm information used to indicate that the target monitoring process exceptionally exits, where the preset terminal sends an operation and maintenance instruction to the server according to the alarm information. The server also maintains the target monitoring process according to the operation and maintenance instruction.

According to another aspect of the embodiments of the present invention, a monitoring apparatus of a server is further provided. The monitoring apparatus of a server includes a memory storing computer program instructions, and a processor coupled to the memory. When executing the computer program instructions, the processor is configured to perform: starting a target monitoring process of a client; monitoring, after the target monitoring process is started, whether the target monitoring process exceptionally exits; sending to a preset terminal when it is detected that the target monitoring process exceptionally exits, alarm information used to indicate that the target monitoring process exceptionally exits, wherein the preset terminal sends an operation and maintenance instruction to the server according to the alarm information; and maintaining the target monitoring process according to the operation and maintenance instruction.

According to another aspect of the embodiments of the present invention, a non-transitory computer-readable storage medium of a server is provided. The non-transitory computer-readable storage medium stores computer program instructions executable by at least one processor to perform: starting a target monitoring process of a client; monitoring, after the target monitoring process is started, whether the target monitoring process exceptionally exits; sending to a preset terminal when it is detected that the target monitoring process exceptionally exits, alarm information used to indicate that the target monitoring process exceptionally exits, wherein the preset terminal sends an operation and maintenance instruction to the server according to the alarm information; and maintaining the target monitoring process according to the operation and maintenance instruction.

Other aspects of the present disclosure can be understood by those skilled in the art in light of the description, the claims, and the drawings of the present disclosure.

BRIEF DESCRIPTION OF THE DRAWINGS

The accompanying drawings described herein are used to provide further understanding of the present disclosure, and form a part of this application. Exemplary embodiments of the present disclosure and descriptions thereof are used for explaining the present disclosure, but do not constitute an improper limitation to the present disclosure. In the accompanying drawings:

FIG. 9 is a schematic diagram of a running monitoring interface of a management console according to an embodiment of the present disclosure;

FIG. 10 is a schematic diagram of a log list interface of a management console according to an embodiment of the present disclosure;

FIG. 11 is a schematic diagram of an interface of a web server of a cloud database according to an embodiment of the present disclosure;

FIG. 12 is a schematic diagram of a monitoring apparatus of a server according to an embodiment of the present disclosure;

DETAILED DESCRIPTION

To make a person skilled in the art understand the solutions in the present disclosure better, the following describes the technical solutions in the embodiments of the present disclosure with reference to the accompanying drawings. Apparently, the described embodiments are merely some but not all of the embodiments of the present disclosure. Other embodiments obtained by a person of ordinary skill in the art based on the embodiments of the present disclosure without creative efforts shall fall in the protection scope of the present disclosure.

It should be noted that, in the specification, the claims, and the accompanying drawings of the present disclosure, the terms "first", "second", and the like are intended to distinguish between similar objects but do not necessarily indicate a specific order or sequence. It should be understood that the data used in this way are interchangeable in an appropriate case, so that the embodiments of the present disclosure described herein can be implemented in an order other than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

According to an aspect of the embodiments of the present disclosure, a monitoring method of a server is provided. The monitoring method of a server is applicable to a hardware environment formed by a server 202 and a terminal 204 shown in FIG. 2.

Figure 1:
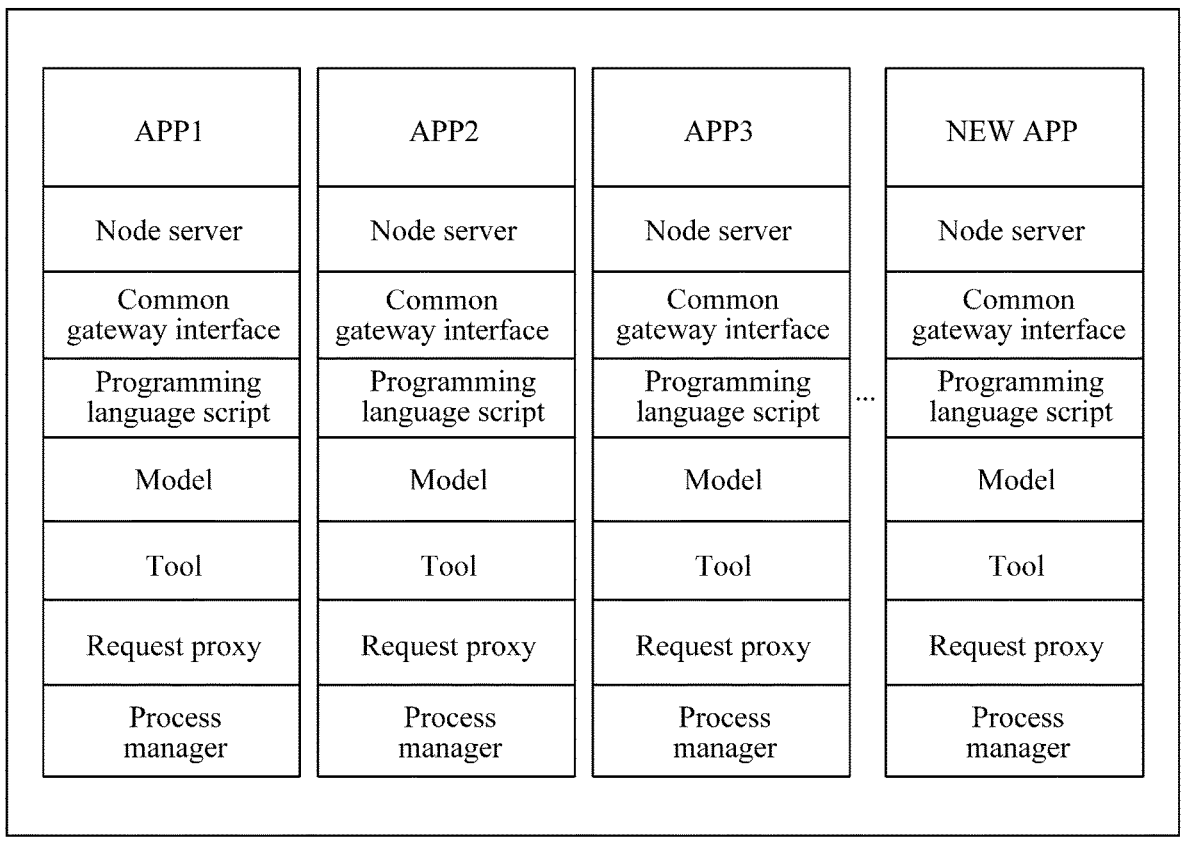
FIG. 1 is a schematic diagram of a running environment of clients in a related technology.
Figure 2:
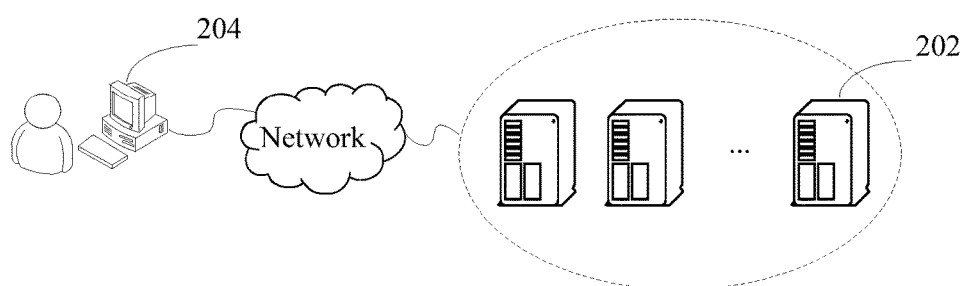
FIG. 2 is a schematic diagram of a hardware environment of a monitoring method of a server according to an embodiment of the present disclosure.

FIG. 2 is a schematic diagram of the hardware environment of the monitoring method of a server according to an embodiment of the present disclosure. As shown in FIG. 2, the server 202 is connected to the terminal 204 by using a network. The network includes a wide area network, a metropolitan area network, or a local area network. The terminal 204 may include a personal computer (PC), a mobile phone, a tablet computer, or the like. The monitoring method of a server may be performed by the server 202, or may be performed by the terminal 204, or may be performed by both the server 202 and the terminal 204. The monitoring method of a server that is performed by the terminal 204 may be performed by a client installed on the terminal 204.

Figure 3:
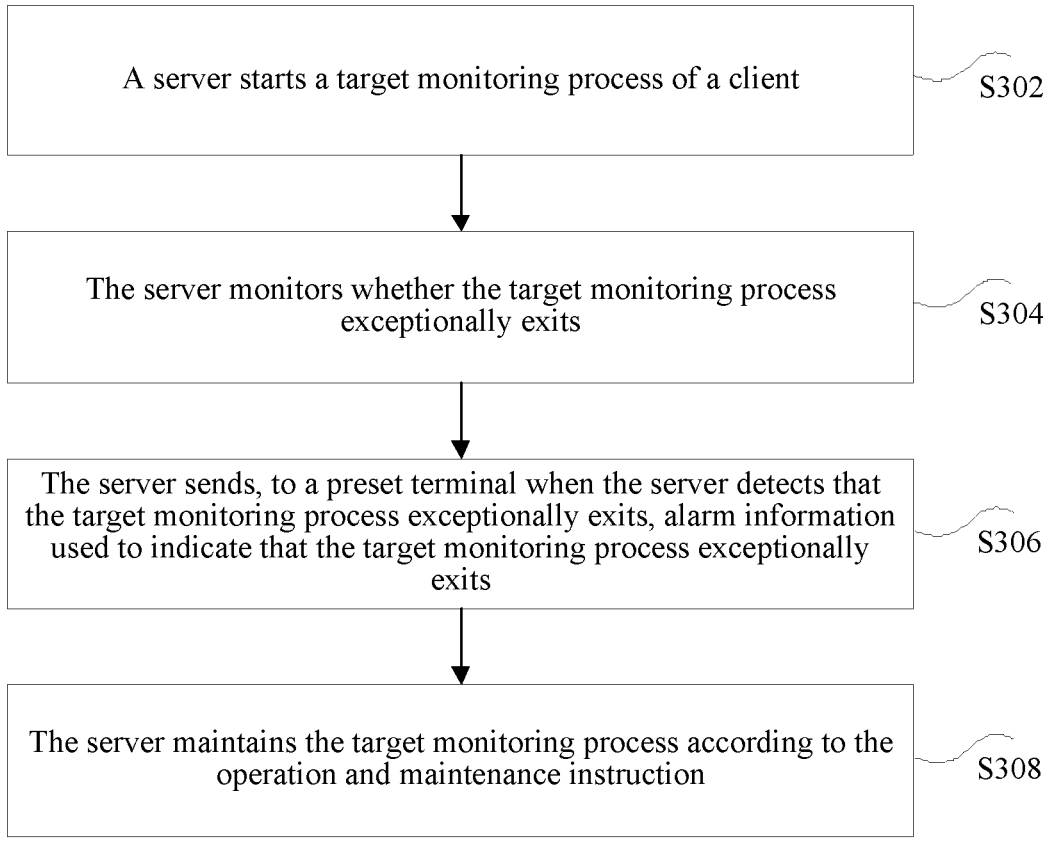
FIG. 3 is a flowchart of a monitoring method of a server according to an embodiment of the present disclosure.

FIG. 3 is a flowchart of a monitoring method of a server according to an embodiment of the present disclosure. As shown in FIG. 3, the monitoring method of a server includes the followings.

S302: The server starts a target monitoring process of a client.

The server accesses the client, and monitors the client by using the target monitoring process. The target monitoring process is a process to be monitored by the server for the client. A service system architecture may be deployed on the server, and the service system architecture is a service framework for function encapsulation. Optionally, a function is encapsulated by using a Nodejs running environment, to implement a preset function of monitoring the client. Optionally, a web server forwards a request of a user to a port of the client. The web server is a reverse proxy server. For example, the web server is an Nginx server. The Nginx server forwards a Hypertext Transfer Protocol (HTTP) request to the port of the client, and the server configured to monitor the client obtains the target monitoring process by using the port of the client. A running status of the client, and a resource allocation status and a resource scheduling status in the system may be determined by using the target monitoring process. The Nginx server is a lightweight web server/reverse proxy server and email proxy server.

To manage and monitor an accessed client, the server first starts a target monitoring process. After the target monitoring process is started, the target monitoring process may be restarted according to a preset restarting condition, to ensure that the target monitoring process remains in a running status. Optionally, the preset restarting condition is a condition that a file of the client is updated, that is, the target monitoring process is smoothly restarted after the file of the client is updated. When a domain number of the client is changed, the target monitoring process may be restarted by using a call interface of the client. Alternatively, the preset restarting condition may be a condition that the server detects that the target monitoring process exits due to an exception, that is, the target monitoring process is automatically restarted when the target monitoring process exceptionally exits.

S304: The server monitors whether the target monitoring process exceptionally exits.

In the technical solution provided in S304 in the present disclosure, after the server starts the target monitoring process, the server monitors whether the target monitoring process exceptionally exits, i.e., whether the target monitoring process exits due to an exception (e.g., an error or unhandled error).

After the server starts the target monitoring process, the target monitoring process starts to run. During running of the target monitoring process, the server may monitor the target monitoring process by using a monitoring module of the target monitoring process, to monitor whether the target monitoring process exceptionally exits due to an exception. If the server detects that the target monitoring process exceptionally exits, the server performs S308. If the server detects that the target monitoring process does not exceptionally exit, the server continues monitoring the target monitoring process.

Optionally, in this embodiment, that the server monitors whether the target monitoring process exceptionally exits includes: monitoring, by the server, whether a client subprocess exceptionally exits.

S306: The server sends, to a preset terminal when the server detects that the target monitoring process exceptionally exits, alarm information used to indicate that the target monitoring process exceptionally exits.

In the technical solution provided in S306 in the present disclosure, the server sends, to the preset terminal when the server detects that the target monitoring process exceptionally exits, the alarm information used to indicate that the target monitoring process exceptionally exits, the preset terminal sending an operation and maintenance instruction to the server according to the alarm information.

After the server detects that the target monitoring process exceptionally exits, the server automatically restarts the target monitoring process when the server detects that the target monitoring process exceptionally exits, and sends, to the preset terminal, the alarm information used to indicate that the target monitoring process exceptionally exits. Optionally, the alarm information is an alarm SMS message, and the preset terminal is a management terminal, for example, a terminal device such as a mobile communications terminal, a tablet computer, a palmtop computer, a mobile Internet device (MID), or a PAD. A telephone number, an email address, and the like of the preset terminal are configured by using a configuration file. When the server detects that the target monitoring process exceptionally exits, the server sends the alarm information to the preset terminal by using the telephone number, the email address, or the like. A user determines, by using the management terminal according to the alarm information, a reason of the exceptional exit, and determines an operation and maintenance method for resolving a problem of the exceptional exit. The management terminal sends, to the server, the operation and maintenance instruction used to maintain the target monitoring process.

S308: The server maintains the target monitoring process according to the operation and maintenance instruction.

After the server sends, to the preset terminal, the alarm information used to indicate that the target monitoring process exceptionally exits, the server receives the operation and maintenance instruction, and maintains the target monitoring process according to the operation and maintenance instruction, so as to prevent the target monitoring process from exceptionally exiting again due to a same reason, thereby achieving an effect of improving monitoring availability of the server.

The server may display a real-time running status of the client and a load status of the target monitoring process, and may display a log file of the client in real time. Optionally, by using a management console, the server displays the real-time running status of the client and the load status of the target monitoring process, and may display the log file of the client in real time, so that the user can understand the real-time running status of the client and the load status of the target monitoring process, and can view and download, in real time, the log file generated by the client.

The log file in this embodiment is generally a record of a specific type of completed processing, to be used as a reference in future. The log file has no fixed format, and is generally a text file. The log file may be opened by using a notepad to view content, and may also have another format.

The server may cause the client to exchange data with a third-party server, and the third-party server is related to a specific service scenario.

According to S302 to S308, a server starts a target monitoring process of a client; the server monitors, after the server starts the target monitoring process, whether the target monitoring process exceptionally exits; the server sends, to a preset terminal when the server detects that the target monitoring process exceptionally exits, alarm information used to indicate that the target monitoring process exceptionally exits, the preset terminal sending an operation and maintenance instruction to the server according to the alarm information; and the server maintains the target monitoring process according to the operation and maintenance instruction, to resolve a technical problem of low monitoring availability of a server in a related technology, so as to achieve a technical effect of improving the monitoring availability of the server.

In one embodiment, after the server starts the target monitoring process of the client, when a service file of the client is updated, the server restarts the target monitoring process.

Figure 4:
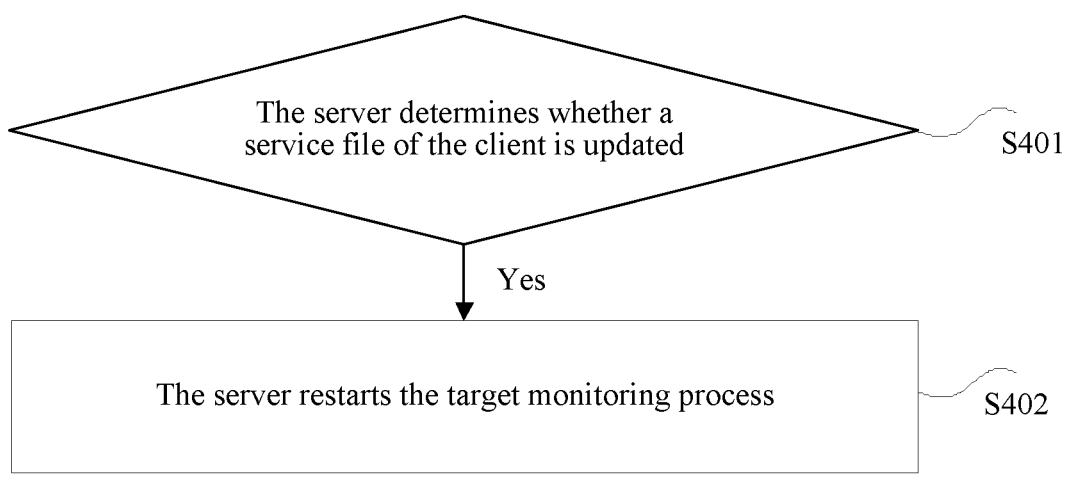
FIG. 4 is a flowchart of another monitoring method of a server according to an embodiment of the present disclosure.

FIG. 4 is a flowchart of another monitoring method of a server according to an embodiment of the present disclosure. As shown in FIG. 4, the monitoring method of a server further includes the followings.

S401: The server determines whether a service file of the client is updated.

For example, after the server starts the target monitoring process of the client, the server determines whether the service file of the client is updated.

When a service of the client is published or a service of the client is modified, the service file of the client needs to be updated, for example, an APP file is to be updated. In one embodiment, after starting the target monitoring process, the server determines whether the service file of the client is updated. If the server determines that the service file of the client is updated, the server performs S402.

S402: The server restarts the target monitoring process.

That is, if the server determines that the service file of the client is updated, the server restarts the target monitoring process.

After the server determines whether the service file of the client is updated, the server restarts the target monitoring process if the server determines that the service file of the client is updated. A process management module of the server may restart the target monitoring process, or the target monitoring process may be restarted by using a call interface of the client, so that the target monitoring process remains in a running status.

It should be noted that, after the server starts the target monitoring process, the server determines whether the service file of the client is updated. The server restarts the target monitoring process if the server determines that the service file of the client is updated. This may be implemented by using a preset service system architecture deployed on the server.

In one embodiment, after the server starts the target monitoring process, the server determines whether the service file of the client is updated. The server restarts the target monitoring process if the server determines that the service file of the client is updated, so that the target monitoring process remains in a running status.

In one embodiment, after the server starts the target monitoring process of the client, the server restarts the target monitoring process when the server detects that the target monitoring process exceptionally exits.

After the server starts the target monitoring process of the client, the server monitors a running status of the target process, and determines whether the target process has an exception, for example, determines whether the target process has an error. If the server detects that the target process has an exception and exits, the server sends the alarm information to a management terminal, and automatically restarts the client process, so that the target monitoring process remains in a running status.

It should be noted that, after the server starts the target monitoring process of the client, the server restarts the target monitoring process when the server detects that the target monitoring process exceptionally exits. This may be implemented by using the preset service system architecture deployed on the server.

In one embodiment, after the server obtains the target monitoring process, after the server starts the target monitoring process of the client, the server displays a status of the client according to the target monitoring process, where the status of the client includes at least one of the followings: a running status of the client, a load status of the client, and a log file of the client.

After the server obtains the target monitoring process, the server may display the status of the client by using a visual management console. The visual management console has a client running monitoring interface and a client log list interface, so that by using the visual management console, the running status of the client can be viewed, and a log file generated by an APP can be viewed and downloaded in real time, thereby improving monitoring availability of the server.

It should be noted that, after the server starts the target monitoring process of the client, the server displays the status of the client according to the target monitoring process. This may be implemented by using the preset service system architecture deployed on the server.

In one embodiment, before the server starts the target monitoring process of the client, the server obtains the target monitoring process according to a processing result, where the processing result is obtained by processing, by using a port of the client, a request of the client that is forwarded by a preset web server, and the request of the client is used to request the web server to allow the client to execute a preset event.

The request of the client that is forwarded by the preset web server is obtained by using the port of the client. The preset web server may be an Nginx server, and the request of the client is used to request the web server to allow the client to execute the preset event, and may be an HTTP request. After the request of the client is obtained by using the port of the client, the request of the client is processed, to obtain the processing result, and the server obtains the processing result, and obtains the target monitoring process according to the processing result.

It should be noted that, before the server starts the target monitoring process of the client, the server obtains the target monitoring process according to the processing result. This may be implemented by using the preset service system architecture deployed on the server.

In one embodiment, the client includes multiple clients, and the obtaining, by the server, the target monitoring process according to a processing result includes: obtaining, by the server, a target monitoring process of each client according to a processing result of each client, where the processing result of each client is obtained by processing, by using a port of each client, a request of each client that is forwarded by the preset web server.

The client may include multiple clients, and the multiple clients may be on a same terminal or may be on separately terminals individually. The request of each client that is forwarded by the preset web server is obtained by using the port of each client. The preset web server may be an Nginx server, and the request of each client is used to request the web server to allow a corresponding client to execute the preset event, and may be an HTTP request. After the request of the corresponding client is obtained by using the port of each client, the request of the corresponding client is processed, to obtain the processing result, and the server obtains the processing result, and obtains the target monitoring process according to the processing result.

In one embodiment, the server does not manage the port, but the port is managed by the corresponding client, and then the preset web server forwards the request to respective ports for processing, thereby achieving an effect of improving monitoring availability of the server.

In one embodiment, before the server starts the target monitoring process of the client, the server listens to a preset port of the server, to obtain the request of the server that is used to request the client to execute the preset event, and the server sends the request of the server to the client, and obtains the target monitoring process according to the processing result that is obtained by processing the request of the server by using the port of the client.

Figure 5:
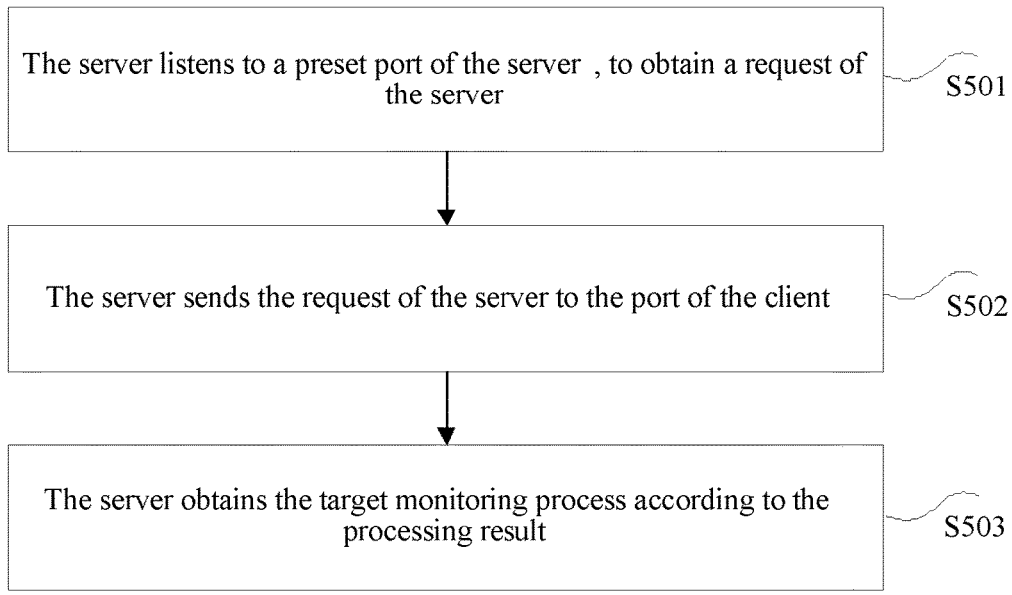
FIG. 5 is a flowchart of another monitoring method of a server according to an embodiment of the present disclosure.

FIG. 5 is a flowchart of another monitoring method of a server according to an embodiment of the present disclosure. As shown in FIG. 5, the monitoring method of a server further includes the followings.

S501: The server listens to a preset port of the server, to obtain a request of the server. The request of the server is used to request the client to execute a preset event.

Before the server starts the target monitoring process of the client, when resources in an outgoing server are sufficient, the server may directly listen to the preset port, to obtain the request used to request the client to execute the preset event. The preset port may be a port 80, the port 80 is opened for the HTTP, and a website may be accessed by adding ":80" to an HTTP address.

S502: The server sends the request of the server to the port of the client. The request of the server is processed by using the port of the client, to obtain the processing result.

After the server listens to the preset port of the server to obtain the request of the server, the server sends the request of the server to the port of the client. The request of the server is received by using the port of the client, and the request of the server is processed, to obtain the processing result. The processing result is used to obtain the target monitoring process.

S503: The server obtains the target monitoring process according to the processing result.

After the server sends the request of the server to the port of the client, the server obtains the target monitoring process according to the processing result, that is, the server accesses the client and monitors the target monitoring process. The server may monitor whether the target monitoring process has an exception during running, and monitor, during running of the target monitoring process, whether the client exits due to the exception. When detecting that the client exceptionally exits, the server sends, to the management terminal, the alarm information used to indicate that the target monitoring process has an exception, and automatically restarts the target monitoring process.

It should be noted that, the server listens to the preset port of the server, to obtain the request of the server that is used to request the client to execute the preset event, and the server sends the request of the server to the client, and obtains the target monitoring process according to the processing result that is obtained by processing the request of the server by using the port of the client. This may be implemented by using the preset service system architecture deployed on the server.

In one embodiment, before the server starts the target monitoring process of the client, the server listens to the preset port of the server, to obtain the request of the server, where the request of the server is used to request the client to execute the preset event; the server sends the request of the server to the port of the client, where the request of the server is processed by using the port of the client, to obtain the processing result; and the server obtains the target monitoring process according to the processing result, so that the target monitoring process is obtained.

In one embodiment, the client includes multiple clients; the sending, by the server, the request of the server to a port of the client includes: distributing, by the server, the request of the server to a port of each client, where the request of the server is processed by using the port of each client, to obtain a processing result of each client; and the obtaining, by the server, the client process according to a processing result includes: obtaining, by the server, a client process of each client according to the processing result of each client.

After the server listens to the preset port of the server, to obtain the request of the server, the server sends the request of the server to the port of each client, that is, a routing operation is performed on the request of the server, and the request may be routed and forwarded to a corresponding client according to domain names, paths, or uniform resource locators of different clients. The request of the server that is routed and forwarded is processed by using the port of each client, to obtain the processing result of each client. After the server sends the request of the server to the port of each client, the server obtains the target monitoring process according to the processing result of each client, that is, the server accesses the client and monitors the target monitoring process.

Optionally, in one embodiment, a web service system architecture for encapsulating a preset function is deployed on the server. The web service system architecture is a high-availability web service system architecture, and the preset function is packaged as an installation package and is deployed on the server.

Optionally, the server exchanges data with a third-party server by using a call interface in a preset running environment and a preset dependency environment.

In one embodiment, the server has a unified standard running environment and dependency environment. The running environment may be a Nodejs running environment. A Nodejs is an open-source, cross-platform, and available running environment of a server and a network application, and is used to compile a network application such as a web server. The server exchanges data with a third-party server by using a call interface in a preset running environment and a preset dependency environment. The call interface is an application programming interface (API), and is a call interface reserved by an operating system for an application program, so that the operating system executes a command in the application program. The third-party server that exchanges data with the server is determined according to an application scenario of a specific service, and may be a service backend server.

In one embodiment, the server manages and monitors an accessed client, including starting the target monitoring process, smoothly restarting the target monitoring process after the file of the client is updated, sending an alarm SMS message to the management terminal when the target monitoring process exceptionally exits and automatically restarting the target monitoring process, displaying a real-time running status of the client and a load status of a client process, displaying a log file generated when the client is viewed and downloaded, and the like, so that when the server monitors the client, monitoring on the client is combined with the alarm information of the target monitoring process, to form a closed loop to further control the target monitoring process, thereby improving monitoring availability of the server.

In one embodiment of the present disclosure, the service system architecture is deployed on the server, and the service system architecture is a service framework for function encapsulation. For example, the server supports the Nodejs running environment, and the service system architecture is a service framework for function encapsulation based on the Nodejs running environment.

Figure 6:
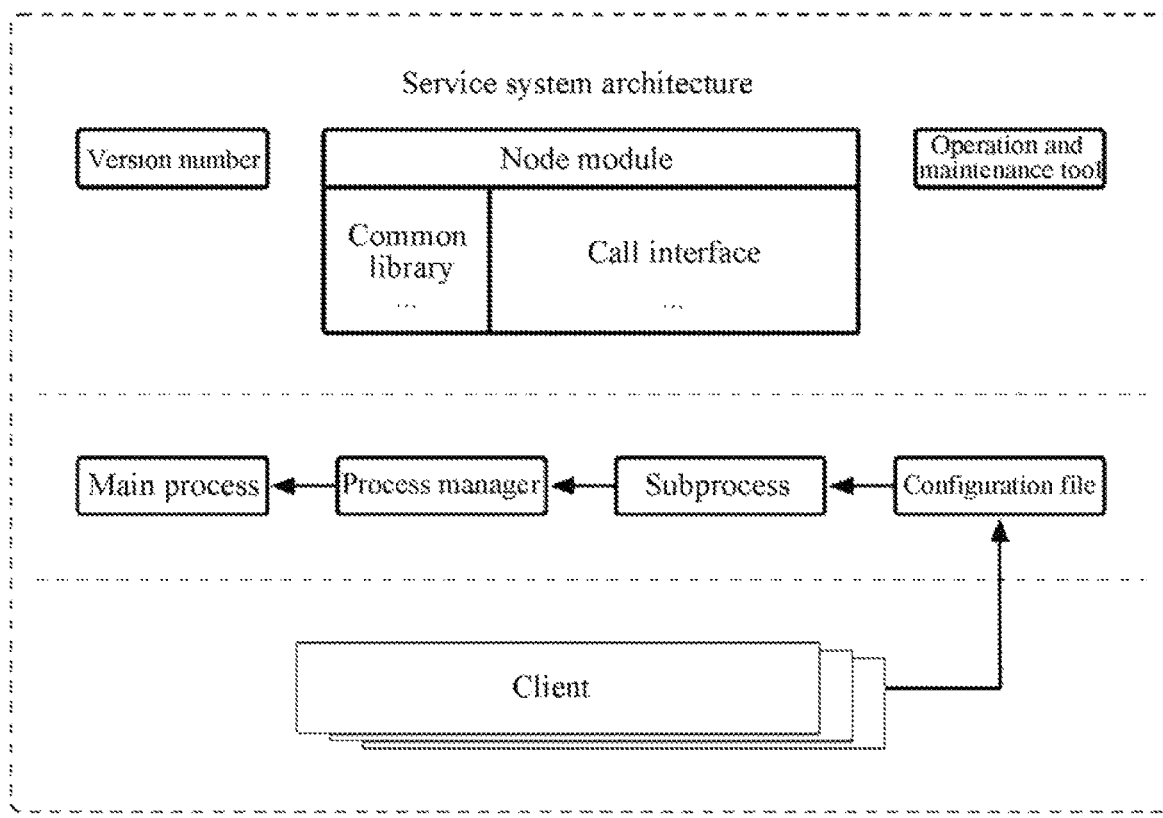
FIG. 6 is a schematic diagram of a service system architecture according to an embodiment of the present disclosure.

FIG. 6 is a schematic diagram of a service system architecture according to an embodiment of the present disclosure. As shown in FIG. 6, multiple clients (APP) are associated with a server by using a configuration file (APPS config), a subprocess is a specific process in which an APP runs, a process manager (an APP process manager) is configured to manage a process, including starting, stopping, restarting, and performing other management on the subprocess, and a main process (Main) is a general process. A version number is used to identify a version type of the service system architecture, a node module (node_modules) is a dependency environment of the service system architecture, includes a common library (for example, an express library, a cookies library, or a react library), and further includes a call interface (an API), and an operation and maintenance tool is a component for maintaining the server.

By using the service system architecture, a server starts a target monitoring process of a client; the server monitors, after the server starts the target monitoring process, whether the target monitoring process exceptionally exits; the server sends, to a preset terminal when the server detects that the target monitoring process exceptionally exits, alarm information used to indicate that the target monitoring process exceptionally exits, the preset terminal sending an operation and maintenance instruction to the server according to the alarm information; and the server maintains the target monitoring process according to the operation and maintenance instruction, thereby improving monitoring availability of the server.

Figure 7:
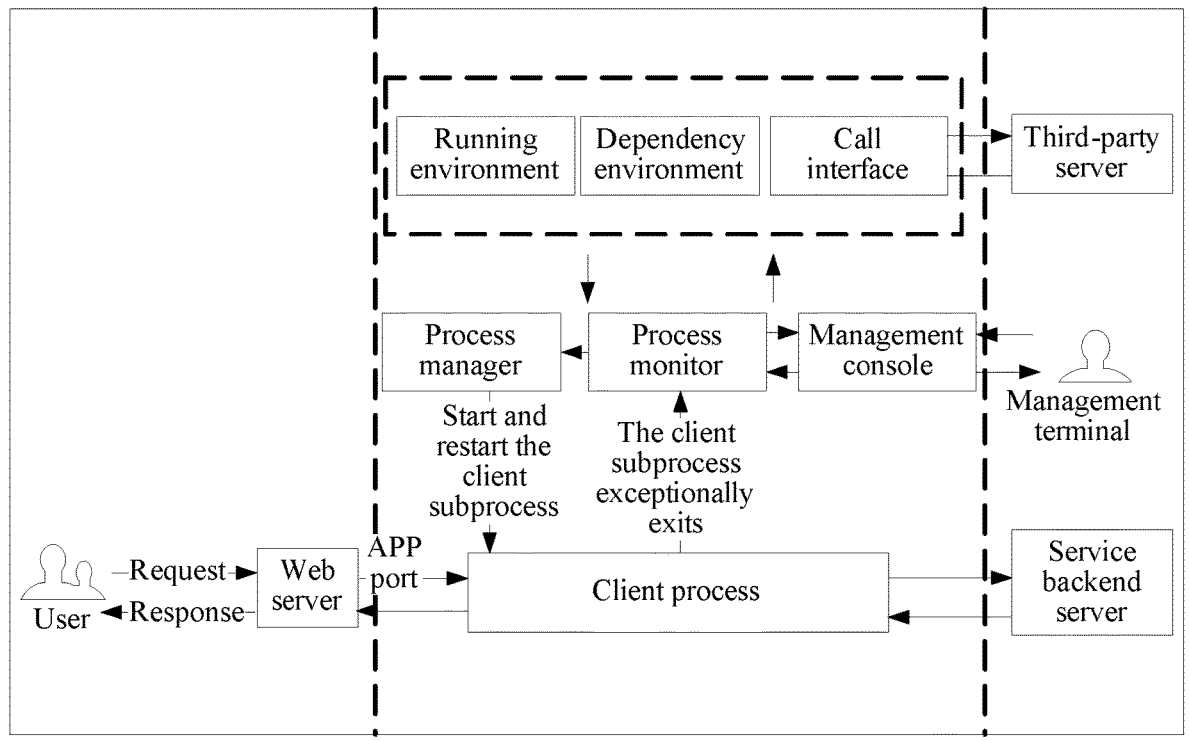
FIG. 7 is another schematic relationship diagram of monitoring by a server according to an embodiment of the present disclosure.

FIG. 7 is another schematic relationship diagram of monitoring by a server according to an embodiment of the present disclosure. As shown in FIG. 7, implementation of a monitoring process involves interaction between a server and multiple systems, including a third-party server, a management terminal, a management console, a service backend server, and a web server. The web server is, for example, an Nginx server. The followings are several stages of implementation.

First: A service system architecture is uniformly deployed on the server that needs to be installed.

Second: The server manages and monitors an accessed client by using the service system architecture, including starting a client process (an APP process), smoothly restarting the client process after a client file (an APP file) is updated, and sending an alarm SMS message to the management terminal when the client process exceptionally exits, and automatically restarting the client process; the management terminal sends, to the management console according to alarm information, a maintenance instruction used to maintain the client process; and the management console transmits the maintenance instruction to the process manager by using a process monitor, to manage the client process.

Optionally, the process monitor monitors whether a client subprocess has an exception and exits. If an APP subprocess has an exception and exits, the process monitor sends, to the process manager, information used to indicate a case in which the client subprocess has an exception and exits. The process manager restarts the client subprocess, and the process manager is further configured to start the client subprocess.

Third: The server provides a visual management console by using the service system architecture. By using the visual management console, a running status of the client process that is sent by the process monitor, a real-time running status of the client, and a load status of the client process can be viewed, and a log file generated by the client can be viewed and downloaded in real time. The management terminal may receive information used to indicate the real-time running status of the client and the load status of the client process, the log file, and the like.

In one embodiment, the web server receives a request sent by a user, where the request may be an HTTP request, and the web server forwards the request to an APP port. The request is processed by using the APP port, to obtain a processing result, and the server obtains a client process according to the processing result. The client process may be further sent to the user by using the web server, so that the web server makes a response to the request.

In one embodiment, the client process exchanges data with the service backend server. A running environment of the server may be a Nodejs running environment, and a dependency environment includes a common library, for example, an express library, a cookies library, or a react library. A common service function is further integrated, and data is exchanged with the third-party server by using a call interface (an API).

Figure 8:
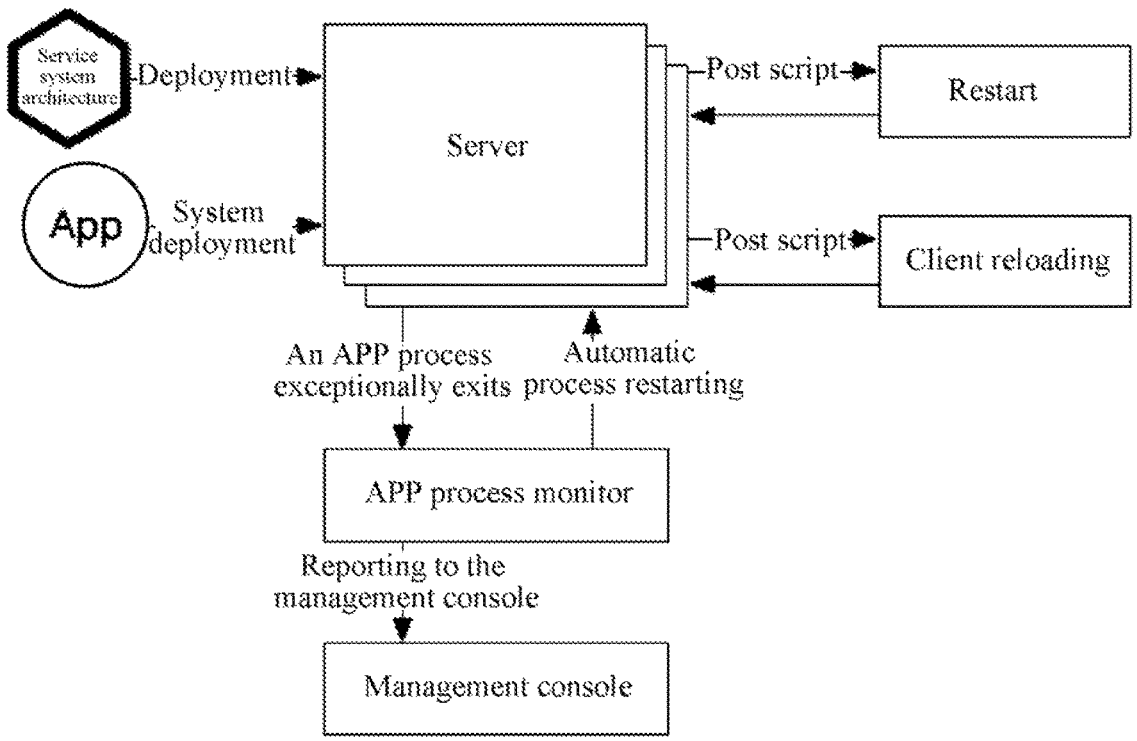
FIG. 8 is a schematic diagram of process management according to an embodiment of the present disclosure.

FIG. 8 is a schematic diagram of process management according to an embodiment of the present disclosure. As shown in FIG. 8, a service system architecture is deployed on a server that needs to be installed, and a client APP is deployed on the server by using the system. When an APP process monitor receives a message used to indicate that an APP process exceptionally exits, the APP process monitor sends, to the server, an instruction used to instruct an APP process manager to restart the APP process, and a process management module deployed on the server automatically restarts the process according to the instruction used to instruct the APP process manager to restart the APP process. The APP process may be restarted by using a post script. After the APP process monitor monitors a case in which the APP process exceptionally exits, the APP process monitor sends, to a management console, the message used to indicate that the APP process exceptionally exits, that is, reports, to the management console, the message used to indicate that the APP process exceptionally exits. By using the management console, a real-time running status of the APP and a load status of the APP process can be viewed, and a log file generated by the APP can be viewed and downloaded in real time. In one embodiment, the client is reloaded by using the post script.

FIG. 9 is a schematic diagram of a running monitoring interface of a management console according to an embodiment of the present disclosure. As shown in FIG. 9, in one embodiment, the management console is implemented by deploying a service system architecture. The running monitoring interface of the management console includes: starting of the management console, a brief introduction to the management console, monitoring, instance running monitoring, an instance log, machine selection, for example, an external network-Guangzhou, and application selection. In addition, in one embodiment, the management console may further display an IP address, for example, display an IP address: 10.251.71.150, 10.251.64.7, 10.250.100.183, or 10.251.196.13, may further display information corresponding to the IP address, for example, information corresponding to the IP address 10.251.71.150: 14246 and 14256, information corresponding to the IP address 10.251.64.7: 25938, 25948, 25958, and 25968, information corresponding to the IP address 10.250.100.183: 18145 and 18155, information corresponding to the IP address 10.251.196.13: 25616, 25626, 25636. 25646, 25656, 25666.2, and the like, and may further display a status corresponding to the IP address, for example, statuses corresponding to the foregoing IP addresses are all normal statuses. In one embodiment, a running status of a central processing unit (CPU) and memory usage may be further displayed, so as to display a real-time running status of the client, thereby improving monitoring availability of the server.

FIG. 10 is a schematic diagram of a log list interface of a management console according to an embodiment of the present disclosure. As shown in FIG. 10, the log list interface of the management console includes: restarting of the management console, a brief introduction, monitoring, instance running monitoring, an instance log, a resource, machine selection, for example, external network-Guangzhou-10.251.71.150, and application selection, and further display a log, and a size, a creation time, an update time, and an operation of the corresponding log, so as to view and download, in real time, a log file generated by an APP, thereby improving monitoring availability of the server.

In one embodiment, when resources in an outgoing server are sufficient, the server may directly listen to a port 80 by using a service system architecture and, then, a request is routed and forwarded to an APP by using the service system architecture for processing, thereby improving monitoring availability of the server.

In one embodiment, by using a uniform running environment, a deployment solution, and a complete monitoring manager and console that are based on a Nodejs, a technical effect of improving the monitoring availability of the server is achieved, thereby resolving a technical problem of low monitoring availability of a server in a related technology.

For an application environment in one embodiment of the present disclosure, refer to the application environment in the foregoing embodiments. One embodiment of the present disclosure provides an optional specific application used to implement the foregoing monitoring method of a server.

A service framework for function encapsulation based on the Nodejs is deployed on the server in one embodiment. The Nodejs is mainly used to compile a network application such as a web server. This is similar to PHP and Python, and may be applied to a web server of a cloud database.

FIG. 11 is a schematic diagram of an interface of a web server of a cloud database according to an embodiment of the present disclosure. As shown in FIG. 11, in one embodiment, the web server of the cloud database may start a target monitoring process of a client; the server monitors, after the server starts the target monitoring process, whether the target monitoring process exceptionally exits; the server sends, to a preset terminal when the server detects that the target monitoring process exceptionally exits, alarm information used to indicate that the target monitoring process exceptionally exits, the preset terminal sending an operation and maintenance instruction to the server according to the alarm information; and the server maintains the target monitoring process according to the operation and maintenance instruction.

The cloud database includes a database (MySQL) and a database management system (SQL Server), further includes an instance list, a task list, a parameter template, an operation log, a database audit, data transmission, database synchronization, and the like, and further includes an ID/instance name, a running status corresponding to each instance, a specification, a home network, an internal IP address, an expiration time, an operation, and the like, thereby achieving an effect of improving monitoring availability of the server.

It should be noted that, for brief description, the foregoing method embodiments are described as a series of action combinations. However, a person skilled in the art should appreciate that the present disclosure is not limited to the described order of the actions, because according to the present disclosure, some steps may be performed in other orders or simultaneously. In addition, a person skilled in the art should also appreciate that all the embodiments described in this specification are preferred embodiments, and the related actions and modules are not necessarily required in the present disclosure.

Accordingly, a person skilled in the art may understand that the method according to the foregoing embodiment may be implemented by software in addition to a necessary universal hardware platform and certainly may also be implemented by hardware. In most circumstances, the former is a preferred implementation. Based on such an understanding, the technical solutions of the present disclosure essentially or the part contributing to the existing technology may be implemented in a form of a software product. The computer software product is stored in a storage medium (such as a read-only memory (ROM)/a random access memory (RAM), a magnetic disk or an optical disc) and includes several instructions for instructing a terminal device (which may be a mobile phone, a computer, a server, a network device, or the like) to perform the methods described in the embodiments of the present disclosure.

According to another aspect of the embodiments of the present disclosure, a monitoring apparatus of a server that is configured to implement the foregoing monitoring method of a server is further provided. FIG. 12 is a schematic diagram of a monitoring apparatus of a server according to an embodiment of the present disclosure. As shown in FIG. 12, the monitoring apparatus of a server may include a starting unit 10, a monitoring unit 20, a first sending unit 30, and a maintenance unit 40.

The starting unit 10 is configured to start a target monitoring process of a client.

To manage and monitor an accessed client, the server first starts a target monitoring process by using the starting unit 10. After the target monitoring process is started by using the starting unit 10, the target monitoring process may be restarted according to a preset restarting condition, to ensure that the target monitoring process remains in a running status. Optionally, the preset restarting condition is a condition that a file of the client is updated, that is, the target monitoring process is smoothly restarted after the file of the client is updated. When a domain value of the client is changed, the target monitoring process may be restarted by using a call interface of the client. Alternatively, the preset restarting condition may be a condition that the server detects that the target monitoring process exits due to an exception, that is, the target monitoring process is automatically restarted when the target monitoring process exceptionally exits.

The monitoring unit 20 is configured to monitor, after the server starts the target monitoring process, whether the target monitoring process exceptionally exits.

After the starting unit 10 starts the target monitoring process, the target monitoring process starts to run. During running of the target monitoring process, the monitoring unit 20 may monitor the target monitoring process by using a monitoring module of the target monitoring process, to monitor whether the target monitoring process exceptionally exits due to an exception. If the monitoring unit 20 detects that the target monitoring process exceptionally exits, the server maintains the target monitoring process according to an operation and maintenance instruction. If the monitoring unit 20 detects that the target monitoring process does not exceptionally exit, the monitoring unit 20 continue monitoring the target monitoring process.

Optionally, in one embodiment, that the monitoring unit 20 monitors whether the target monitoring process exceptionally exits includes: monitoring whether a client subprocess exceptionally exits.

The first sending unit 30 is configured to send, to a preset terminal when the server detects that the target monitoring process exceptionally exits, alarm information used to indicate that the target monitoring process exceptionally exits, the preset terminal sending an operation and maintenance instruction to the server according to the alarm information.

After the monitoring unit 20 detects that the target monitoring process exceptionally exits, the server automatically restarts the target monitoring process when the server detects that the target monitoring process exceptionally exits, and the first sending unit 30 sends, to the preset terminal, the alarm information used to indicate that the target monitoring process exceptionally exits. Optionally, the alarm information is an alarm SMS message, and the preset terminal is a management terminal, for example, a terminal device such as a mobile communications terminal, a tablet computer, a palmtop computer, an MID, or a PAD. A telephone number, an email address, and the like of the preset terminal are configured by using a configuration file. When the monitoring unit 20 detects that the target monitoring process exceptionally exits, the first sending unit 30 sends the alarm information to the preset terminal by using the telephone number, the email address, or the like. A user determines, by using the management terminal according to the alarm information, a reason of the exceptional exit, and determines an operation and maintenance method for resolving a problem of the exceptional exit. The management terminal sends, to the server, the operation and maintenance instruction used to maintain the target monitoring process.

The maintenance unit 40 is configured to maintain the target monitoring process according to the operation and maintenance instruction.

After the first sending unit 30 is configured to send, to the preset terminal, the alarm information used to indicate that the target monitoring process exceptionally exits, the server receives the operation and maintenance instruction, and the maintenance unit 40 maintains the target monitoring process according to the operation and maintenance instruction, so as to prevent the target monitoring process from exceptionally exiting again due to a same reason, thereby achieving an effect of improving monitoring availability of the server.

The server may display a real-time running status of the client and a load status of the target monitoring process, and may display a log file of the client in real time. Optionally, by using a management console, the server displays the real-time running status of the client and the load status of the target monitoring process, and may display the log file of the client in real time, so that the user can understand the real-time running status of the client and the load status of the target monitoring process, and can view and download, in real time, the log file generated by the client.

The server may cause the client to exchange data with a third-party server, and the third-party server is related to a specific service scenario.

Further, it should be noted that, the starting unit 10, the monitoring unit 20, the first sending unit 30, and the maintenance unit 40 may serve as parts of the apparatus and run in a terminal. Functions implemented by the foregoing modules may be performed by a processor in the terminal. Alternatively, the terminal may be a terminal device such as a smartphone (for example, an Android mobile phone or an iOS mobile phone), a tablet computer, a palmtop computer, an MID, or a PAD.

Figure 13:
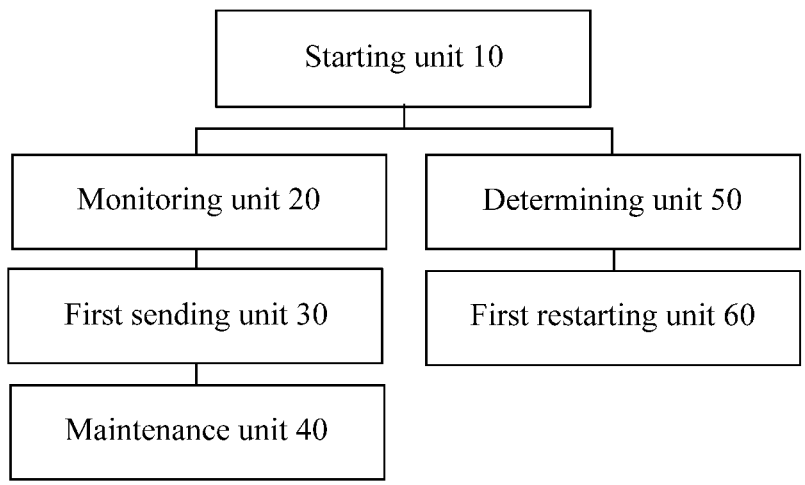
FIG. 13 is a schematic diagram of another monitoring apparatus of a server according to an embodiment of the present disclosure.

FIG. 13 is a schematic diagram of another monitoring apparatus of a server according to an embodiment of the present disclosure. As shown in FIG. 13, the monitoring apparatus of a server may include a starting unit 10, a monitoring unit 20, a first sending unit 30, and a maintenance unit 40. The monitoring apparatus of a server further includes a determining unit 50 and a first restarting unit 60.

It should be noted that, in one embodiment, the starting unit 10, the monitoring unit 20, the first sending unit 30, and the maintenance unit 40 have same functions as the monitoring apparatus of a server in the embodiment shown in FIG. 12, and details are not repeated herein.

The determining unit 50 is configured to determine, after the server starts the target monitoring process of the client, whether a service file of the client is updated.

When a service of the client is published or a service of the client is modified, the service file of the client needs to be updated, for example, an APP file is to be updated. In one embodiment, the determining unit 50 determines, after the after the server starts the target monitoring process of the client, whether the service file of the client is updated.

The first restarting unit 60 is configured to restart the target monitoring process when the server determines that the service file of the client is updated.

After the determining unit 50 determines whether the service file of the client is updated, the first restarting unit 60 restarts the target monitoring process if the determining unit 50 determines that the service file of the client is updated. The first restarting unit 60 may restart the target monitoring process by using a process management module of the server, or may restart the target monitoring process by using a call interface of the client, so that the target monitoring process remains in a running status.

Herein, it should be noted that, the determining unit 50 and the first restarting unit 60 may serve as parts of the apparatus and run in a terminal. Functions implemented by the foregoing modules may be performed by a processor in the terminal. Alternatively, the terminal may be a terminal device such as a smartphone (for example, an Android mobile phone or an iOS mobile phone), a tablet computer, a palmtop computer, an MID, or a PAD.

Figure 14:
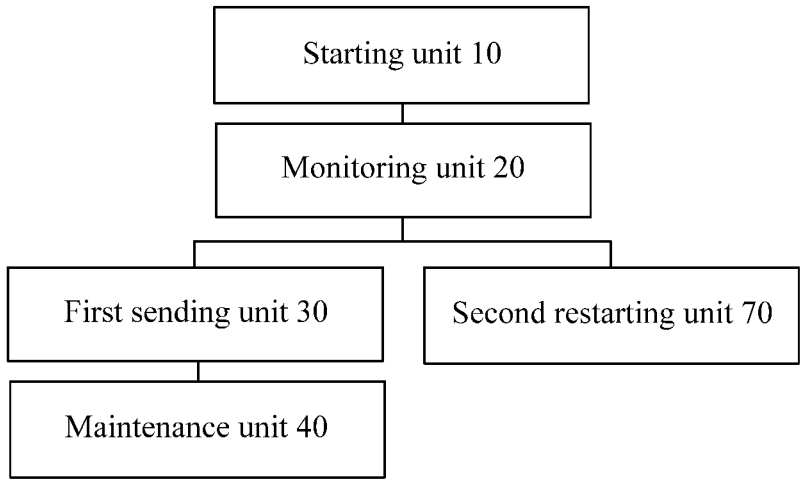
FIG. 14 is a schematic diagram of another monitoring apparatus of a server according to an embodiment of the present disclosure.

FIG. 14 is a schematic diagram of another monitoring apparatus of a server according to an embodiment of the present disclosure. As shown in FIG. 14, the monitoring apparatus of a server may include a starting unit 10, a monitoring unit 20, a first sending unit 30, and a maintenance unit 40. The monitoring apparatus of a server further includes a second restarting unit 70.

It should be noted that, in one embodiment, the starting unit 10, the monitoring unit 20, the first sending unit 30, and the maintenance unit 40 have same functions as the monitoring apparatus of a server in the embodiment shown in FIG. 12, and details are not described herein again.

The second restarting unit 70 is configured to, after the server starts the target monitoring process of the client, restart the target monitoring process when the server detects that the target monitoring process exceptionally exits.

After the starting unit 10 starts the target monitoring process of the client, the server monitors a running status of the target process, and determines whether the target process has an exception, for example, determines whether the target process has an error. If the monitoring unit 20 detects that the target process has an exception and exits, the server sends alarm information to a management terminal, and the second restarting unit 70 automatically restarts the client process, so that the target monitoring process remains in a running status.

Herein, it should be noted that, the second restarting unit 70 may serve as a part of the apparatus and run in a terminal. Functions implemented by the foregoing modules may be performed by a processor in the terminal. Alternatively, the terminal may be a terminal device such as a smartphone (for example, an Android mobile phone or an iOS mobile phone), a tablet computer, a palmtop computer, an MID, or a PAD.

Figure 15:
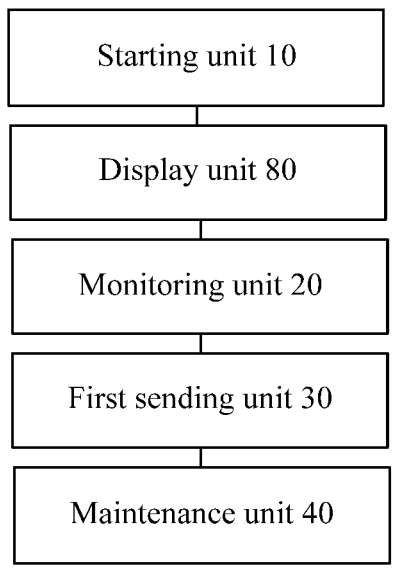
FIG. 15 is a schematic diagram of another monitoring apparatus of a server according to an embodiment of the present disclosure.

FIG. 15 is a schematic diagram of another monitoring apparatus of a server according to an embodiment of the present disclosure. As shown in FIG. 15, the monitoring apparatus of a server may include a starting unit 10, a monitoring unit 20, a first sending unit 30, and a maintenance unit 40. The monitoring apparatus of a server further includes a display unit 80.

It should be noted that, in one embodiment, the starting unit 10, the monitoring unit 20, the first sending unit 30, and the maintenance unit 40 have same functions as the monitoring apparatus of a server in the embodiment shown in FIG. 12, and details are not described herein again.

The display unit 80 is configured to, after the server starts the target monitoring process of the client, display a status of the client according to the target monitoring process, where the status of the client includes at least one of the followings: a running status of the client, a load status of the client, and a log file of the client.

The display unit 80 may display the status of the client by using a visual management console. The visual management console has a client running monitoring interface and a client log list interface, so that by using the visual management console, the running status of the client can be viewed, and a log file generated by an APP can be viewed and downloaded in real time, thereby improving monitoring availability of the server.

It should be noted that, the display unit 80 may serve as a part of the apparatus and run in a terminal. Functions implemented by the foregoing modules may be performed by a processor in the terminal. Alternatively, the terminal may be a terminal device such as a smartphone (for example, an Android mobile phone or an iOS mobile phone), a tablet computer, a palmtop computer, an MID, or a PAD.

Optionally, the apparatuses shown in FIG. 12 to FIG. 15 further include a first obtaining unit, configured to: before the server starts the target monitoring process of the client, obtain the target monitoring process according to a processing result, where the processing result is obtained by processing, by using a port of the client, a request of the client that is forwarded by a preset web server, and the request of the client is used to request the web server to allow the client to execute a preset event.

The request of the client that is forwarded by the preset web server is obtained by using the port of the client. The preset web server may be an Nginx server, and the request of the client is used to request the web server to allow the client to execute the preset event, and may be an HTTP request. After the request of the client is obtained by using the port of the client, the request of the client is processed, to obtain the processing result, and the server obtains the processing result, and obtains the target monitoring process according to the processing result.

Optionally, the client includes multiple clients, and the first obtaining unit is configured to obtain a target monitoring process of each client according to a processing result of each client, where the processing result of each client is obtained by processing, by using a port of each client, a request of each client that is forwarded by the preset web server.

The client includes multiple clients, and the request of each client that is forwarded by the preset web server is obtained by using the port of each client. The preset web server may be an Nginx server, and the request of each client is used to request the web server to allow a corresponding client to execute the preset event, and may be an HTTP request. After the request of the corresponding client is obtained by using the port of each client, the request of the corresponding client is processed, to obtain the processing result, and the first obtaining unit causes the server to obtain the processing result, and obtain the target monitoring process according to the processing result.

Herein, it should be noted that, the first obtaining unit may serve as a part of the apparatus and run in a terminal. Functions implemented by the foregoing modules may be performed by a processor in the terminal. Alternatively, the terminal may be a terminal device such as a smartphone (for example, an Android mobile phone or an iOS mobile phone), a tablet computer, a palmtop computer, an MID, or a PAD.

Optionally, the apparatuses shown in FIG. 12 to FIG. 15 further include a listening unit, configured to: before the server starts the target monitoring process of the client, listen to a preset port of the server, to obtain a request of the server, where the request of the server is used to request the client to execute a preset event; a second sending unit, configured to send the request of the server to a port of the client, where the request of the server is processed by using the port of the client, to obtain a processing result; and a second obtaining unit, configured to obtain the target monitoring process according to the processing result.

Before the server starts the target monitoring process of the client, when resources in an outgoing server are sufficient, the listening unit may cause the server to directly listen to the preset port, to obtain the request used to request the client to execute the preset event. The preset port may be a port 80, the port 80 is opened for the HTTP, and a website may be accessed by adding ":80" to an HTTP address.

The second sending unit is configured to: after the server listens to the preset port of the server to obtain the request of the server, send the request of the server to the port of the client. The request of the server is received by using the port of the client, and the request of the server is processed, to obtain the processing result.

The second obtaining unit is configured to: after the server sends the request of the server to the port of the client, obtain the target monitoring process according to the processing result, that is, the server accesses the client and monitors the target monitoring process. The server may monitor whether the target monitoring process has an exception during running, and exits due to the exception. When detecting that the client exceptionally exits, the server sends, to the management terminal by using the second obtaining unit, the alarm information used to indicate that the target monitoring process has an exception, and automatically restarts the target monitoring process.

Optionally, the client includes multiple clients; the second sending unit is configured to distribute the request to a port of each client, where the request is processed by using the port of each client, to obtain a processing result of each client; and the second obtaining unit is configured to obtain a client process of each client according to the processing result of each client.

After the server listens to the preset port of the server, to obtain the request of the server, the server sends the request of the server to the port of each client, that is, a routing operation is performed on the request of the server, and the request may be routed and forwarded to a corresponding client according to domain names, paths, or uniform resource locators of different clients. The request of the server that is routed and forwarded is processed by using the port of each client, to obtain the processing result of each client. After the server sends the request of the server to the port of each client, the server obtains the target monitoring process according to the processing result of each client, that is, the server accesses the client and monitors the target monitoring process.

Optionally, in the monitoring apparatus of a server in the foregoing embodiment, a web service system architecture for containing a preset function is deployed on the server. The web service system architecture is a high-availability web service system architecture, and the preset function is packaged as an installation package and is deployed on the server.

Optionally, the server exchanges data with a third-party server by using a call interface in a preset running environment and a preset dependency environment.

In one embodiment, the server has a unified standard running environment and dependency environment. The running environment may be a Nodejs running environment. The third-party server that exchanges data with the server is determined according to an application scenario of a specific service, and may be a service backend server.

It should be noted that, the listening unit, the second sending unit, and the second obtaining unit may serve as parts of the apparatus and run in a terminal. Functions implemented by the foregoing modules may be performed by a processor in the terminal. Alternatively, the terminal may be a terminal device such as a smartphone (for example, an Android mobile phone or an iOS mobile phone), a tablet computer, a palmtop computer, an MID, or a PAD.

It should be noted that, the starting unit 10 in one embodiment may be configured to perform S302 in the embodiment of this application; the monitoring unit 20 in one embodiment may be configured to perform S304 in the embodiment of this application; the first sending unit 30 in one embodiment may be configured to perform S306 in the embodiment of this application; and the maintenance unit 40 in one embodiment may be configured to perform S308 in the embodiment of this application. In one embodiment, the starting unit 10 causes a server to start a target monitoring process of a client; the monitoring unit 20 monitors, after the server starts the target monitoring process, whether the target monitoring process exceptionally exits; the first sending unit 30 sends, to a preset terminal when the server detects that the target monitoring process exceptionally exits, alarm information used to indicate that the target monitoring process exceptionally exits, the preset terminal sending an operation and maintenance instruction to the server according to the alarm information; and the maintenance unit 40 maintains the target monitoring process according to an operation and maintenance instruction, to achieve an objective of monitoring the target process, so as to achieve a technical effect of improving monitoring availability of the server, thereby resolving a technical problem of low monitoring availability of a server in a related technology.

It should be noted that, examples implemented by the foregoing units and modules and corresponding steps and application scenarios thereof are the same, but are not limited to the content disclosed in the foregoing embodiments. It should be noted that, the foregoing modules as parts of the apparatus may run in the hardware environment shown in FIG. 2, and may be implemented by software or may be implemented by hardware. The hardware environment includes a network environment.

According to another aspect of the embodiments of the present disclosure, a terminal configured to implement the foregoing monitoring method of a server is further provided. The terminal may be a computer terminal, and the computer terminal may be any computer terminal device in a computer terminal group. Optionally, in one embodiment, the foregoing computer terminal may be replaced with a terminal device such as a mobile terminal.

Optionally, in one embodiment, the foregoing computer terminal may be located in at least one of multiple network devices in a computer network.

Figure 16:
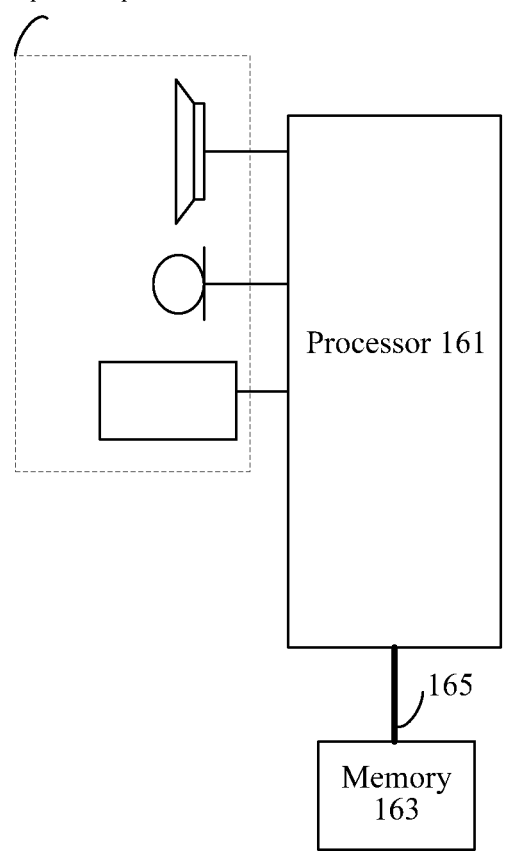
FIG. 16 is a structural block diagram of a terminal according to an embodiment of the present disclosure.

FIG. 16 is a structural block diagram of a terminal according to an embodiment of the present disclosure. As shown in FIG. 16, the terminal may include one or more (only one is shown in the figure) processors 161, a memory 163, and a transmission apparatus 165. As shown in FIG. 16, the terminal may further include an input/output device 167.

The memory 163 may be configured to store a software program and module, for example, a program instruction/module corresponding to the monitoring method and apparatus of a server in the embodiments of the present disclosure. The processor 161 performs various functional applications and data processing by running the software program and module stored in the memory 163, that is, implements the foregoing monitoring method of a server. The memory 163 may include a high-speed RAM, and may also include a non-volatile memory such as one or more magnetic storage apparatuses, a flash memory, or another non-volatile solid-state memory. In some embodiments, the memory 163 may further include memories remotely disposed relative to the processor 161, and these remote memories may be connected to the terminal by using a network. Examples of the network include, but are not limited to, the Internet, an intranet, a local area network, a mobile communications network, and a combination thereof.

The transmission apparatus 165 is configured to receive or send data by using a network, and may be further configured to transmit data between the processor and the memory. Specific examples of the foregoing network may include a wired network and a wireless network. In an example, the transmission apparatus 165 includes a network interface controller (NIC) that may be connected to another network device and a router by using a network cable, thereby communicating with the Internet or a local area network. In an example, the transmission apparatus 165 is a radio frequency (RF) module that is configured to communicate with the Internet in a wireless manner.

Specifically, the memory 163 is configured to store an application program.

The processor 161 may invoke, by using the transmission apparatus 165, the application program stored in the memory 163, so as to execute program code of steps in the methods in various optional or preferred embodiments in the foregoing method embodiments, including: starting, a target monitoring process of a client; monitoring, after the server starts the target monitoring process, whether the target monitoring process exceptionally exits; sending, to a preset terminal when the server detects that the target monitoring process exceptionally exits, alarm information used to indicate that the target monitoring process exceptionally exits, the preset terminal sending an operation and maintenance instruction to the server according to the alarm information; and maintaining the target monitoring process according to the operation and maintenance instruction.

The processor 161 is further configured to perform the following steps: after the server starts the target monitoring process of the client, determining whether a service file of the client is updated; and restarting the target monitoring process if the server determines that the service file of the client is updated.

The processor 161 is further configured to perform the following step: after the server starts the target monitoring process of the client, restarting the target monitoring process when the server detects that the target monitoring process exceptionally exits.

The processor 161 is further configured to perform the following step: after the server starts the target monitoring process of the client, displaying a status of the client according to the target monitoring process, where the status of the client includes at least one of the followings: a running status of the client, a load status of the client, and a log file of the client.

The processor 161 is further configured to perform the following step: before the server starts the target monitoring process of the client, obtaining the target monitoring process according to a processing result, where the processing result is obtained by processing, by using a port of the client, a request of the client that is forwarded by a preset web server, and the request of the client is used to request the web server to allow the client to execute a preset event.

The client includes multiple clients, and the processor 161 is further configured to perform the following step: obtaining a target monitoring process of each client according to a processing result of each client, where the processing result of each client is obtained by processing, using a port of each client, a request of each client that is forwarded by the preset web server.

The processor 161 is further configured to perform the following steps: before the server starts the target monitoring process of the client, listening to a preset port of the server, to obtain a request of the server, where the request of the server is used to request the client to execute a preset event; sending the request of the server to a port of the client, where the request of the server is processed by using the port of the client, to obtain a processing result; and obtaining the target monitoring process according to the processing result.

The client includes multiple clients, and the processor 161 is further configured to perform the following steps: distributing the request of the server to a port of each client, where the request of the server is processed by using the port of each client, to obtain a processing result of each client; and obtaining a client process of each client according to the processing result of each client.

According to one embodiment of the present disclosure, a monitoring solution of a server is provided. A server starts a target monitoring process of a client; the server monitors, after the server starts the target monitoring process, whether the target monitoring process exceptionally exits; the server sends, to a preset terminal when the server detects that the target monitoring process exceptionally exits, alarm information used to indicate that the target monitoring process exceptionally exits, the preset terminal sending an operation and maintenance instruction to the server according to the alarm information; and the server maintains the target monitoring process according to the operation and maintenance instruction, to achieve an objective of monitoring the target process, so as to achieve a technical effect of improving monitoring availability of the server, thereby resolving a technical problem of low monitoring availability of a server in a related technology.

Optionally, for a specific example in one embodiment, refer to examples described in the foregoing embodiments, and details are not described in one embodiment again.

A person of ordinary skill in the art may understand that, the structure shown in FIG. 16 is only an example. The terminal may be a terminal device such as a smartphone (for example, an Android mobile phone or an iOS mobile phone), a tablet computer, a palmtop computer, an MID, or a PAD. FIG. 16 does not limit the structure of the foregoing electronic apparatus. For example, the terminal may further include more or fewer components (such as a network interface and a display apparatus) than those shown in FIG. 16, or has a configuration different from that shown in FIG. 16.

A person of ordinary skill in the art may understand that all or some of the steps of the methods in the embodiments may be implemented by a program instructing related hardware of a terminal device. The program may be stored in a computer-readable storage medium. The storage medium may include a flash memory, a ROM, a RAM, a magnetic disk, or an optical disc.

An embodiment of the present disclosure further provides a storage medium. Optionally, in one embodiment, the storage medium may store program code, and the program code is used to perform steps of program code in the monitoring method of a server that is provided in the foregoing method embodiments.

Optionally, in one embodiment, the storage medium may be located in any computer terminal in a computer terminal group in a computer network, or located in any mobile terminal in any mobile terminal group.

Optionally, in one embodiment, the storage medium is configured to store program code executable by a processor to perform the following steps: starting a target monitoring process of a client; monitoring, after the server starts the target monitoring process, whether the target monitoring process exceptionally exits; sending, to a preset terminal when the server detects that the target monitoring process exceptionally exits, alarm information used to indicate that the target monitoring process exceptionally exits, the preset terminal sending an operation and maintenance instruction to the server according to the alarm information; and maintaining the target monitoring process according to the operation and maintenance instruction.

Optionally, the storage medium is further configured to store program code executable by the processor to perform the following steps: after the server starts the target monitoring process of the client, determining whether a service file of the client is updated; and restarting the target monitoring process if the server determines that the service file of the client is updated; or restarting the target monitoring process when the server detects that the target monitoring process exceptionally exits.

Optionally, the storage medium is further configured to store program code executable by the processor to perform the following step: after the server starts the target monitoring process of the client, restarting the target monitoring process when the server detects that the target monitoring process exceptionally exits.

Optionally, the storage medium is further configured to store program code executable by the processor to perform the following step: after the server starts the target monitoring process of the client, displaying a status of the client according to the target monitoring process, where the status of the client includes at least one of the followings: a running status of the client, a load status of the client, and a log file of the client Optionally, the storage medium is further configured to store program code executable by the processor to perform the following step: before the server starts the target monitoring process of the client, obtaining the target monitoring process according to a processing result, where the processing result is obtained by processing, by using a port of the client, a request of the client that is forwarded by a preset web server, and the request of the client is used to request the web server to allow the client to execute a preset event.

Optionally, the client includes multiple clients, and the storage medium is further configured to store program code executable by the processor to perform the following step: obtaining a target monitoring process of each client according to a processing result of each client, where the processing result of each client is obtained by processing, by using a port of each client, a request of each client that is forwarded by the preset web server.

Optionally, the storage medium is further configured to store program code executable by the processor to perform the following steps: before the server starts the target monitoring process of the client, listening to a preset port of the server, to obtain a request of the server, where the request of the server is used to request the client to execute a preset event; sending the request of the server to a port of the client, where the request of the server is processed by using the port of the client, to obtain a processing result; and obtaining the target monitoring process according to the processing result.

Optionally, the client includes multiple clients, and the storage medium is further configured to store program code executable by the processor to perform the following steps: distributing the request of the server to a port of each client, where the request of the server is processed by using the port of each client, to obtain a processing result of each client; and obtaining a client process of each client according to the processing result of each client.

For a specific example in one embodiment, refer to examples described in the foregoing embodiments, and details are not described in one embodiment again.

In one embodiment, the storage medium may include, but is not limited to, any medium that can store program code, such as a USB flash drive, a ROM, a RAM, a removable hard disk, a magnetic disk, or an optical disc.

According to another aspect of the embodiments of the present disclosure, a monitoring device of a server is further provided. The device includes one or more processors, and one or more memories storing instructions. The instructions are executed by the processor, and program units to be executed by the processor include a starting unit, configured to start a target monitoring process of a client; a monitoring unit, configured to monitor, after the server starts the target monitoring process, whether the target monitoring process exceptionally exits; a first sending unit, configured to send, to a preset terminal when the server detects that the target monitoring process exceptionally exits, alarm information used to indicate that the target monitoring process exceptionally exits, the preset terminal sending an operation and maintenance instruction to the server according to the alarm information; and a maintenance unit, configured to maintain the target monitoring process according to the operation and maintenance instruction.

Optionally, the program units further include: a determining unit, configured to determine, after the server starts the target monitoring process of the client, whether a service file of the client is updated; and a first restarting unit, configured to restart the target monitoring process when the server determines that the service file of the client is updated.

Optionally, the program units further include: a second restarting unit, configured to: after the server starts the target monitoring process of the client, restart the target monitoring process when the server detects that the target monitoring process exceptionally exits.

Optionally, the program units further include: a display unit, configured to: after the server starts the target monitoring process of the client, display a status of the client according to the target monitoring process, where the status of the client includes at least one of the followings: a running status of the client, a load status of the client, and a log file of the client.

Optionally, the program units further include: a first obtaining unit, configured to: before the server starts the target monitoring process of the client, obtain the target monitoring process according to a processing result, where the processing result is obtained by processing, by using a port of the client, a request of the client that is forwarded by a preset web server, and the request of the client is used to request the web server to allow the client to execute a preset event.

Optionally, the client includes multiple clients, and the first obtaining unit is configured to obtain a target monitoring process of each client according to a processing result of each client, where the processing result of each client is obtained by processing, by using a port of each client, a request of each client that is forwarded by the preset web server.

Optionally, the program units further include a listening unit, configured to: before the server starts the target monitoring process of the client, listen to a preset port of the server, to obtain a request of the server, where the request of the server is used to request the client to execute a preset event; a second sending unit, configured to send the request of the server to a port of the client, where the request of the server is processed by using the port of the client, to obtain a processing result; and a second obtaining unit, configured to obtain the target monitoring process according to the processing result.

Optionally, the second sending unit is configured to distribute the request to a port of each client, where the request is processed by using the port of each client, to obtain a processing result of each client; and the second obtaining unit is configured to obtain a target monitoring process of each client according to the processing result of each client.

The monitoring method and apparatus of a server, and the storage medium according to the present disclosure are described by using examples with reference to the accompanying drawings. However, a person skilled in the art should understand that, for the monitoring method and apparatus of a server, and the storage medium that are provided in the present disclosure, various improvements may be made without departing from the content of the present disclosure. Therefore, the protection scope of the present disclosure should be determined based on content of the appended claims.

The sequence numbers of the foregoing embodiments of the present disclosure are merely for description but do not indicate the preference of the embodiments.

When the integrated unit in the embodiments is implemented in the form of a software functional unit and sold or used as an independent product, the integrated unit may be stored in the computer-readable storage medium. Based on such an understanding, the technical solutions of the present disclosure essentially, or the part contributing to the existing technology, or all or some of the technical solutions may be implemented in a form of a software product. The computer software product is stored in a storage medium and includes several instructions for instructing one or more computer devices (which may be a PC, a server, a network device, or the like) to perform all or some of the steps of the method described in the embodiments of the present disclosure.

In the foregoing embodiments of the present disclosure, the description of each embodiment has respective focuses. For a part that is not described in detail in an embodiment, refer to related descriptions in other embodiments.

In the several embodiments provided in this application, it should be understood that the disclosed client may be implemented in other manners. The described apparatus embodiment is merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

It should be noted that the above descriptions are merely preferred embodiments of the present disclosure, and a person of ordinary skill in the art may make various improvements and refinements without departing from the spirit of the present disclosure. All such modifications and refinements should also be considered as falling within the protection scope of the present disclosure.

INDUSTRIAL APPLICABILITY

In the embodiments of the present disclosure, a server starts a target monitoring process of a client; the server monitors, after the server starts the target monitoring process, whether the target monitoring process exceptionally exits; the server sends, to a preset terminal when the server detects that the target monitoring process exceptionally exits, alarm information used to indicate that the target monitoring process exceptionally exits, the preset terminal sending an operation and maintenance instruction to the server according to the alarm information; and the server maintains the target monitoring process according to the operation and maintenance instruction, to achieve an objective of monitoring the target process, so as to achieve a technical effect of improving monitoring availability of the server, thereby resolving a technical problem of low monitoring availability of a server in a related technology.

What is claimed is:

1. A monitoring method of a server, comprising:
   starting, by the server, a target monitoring process of a client, the client being configured to exchange data with a third-party server related to a specific service scenario;
   monitoring, by the server after the server starts the target monitoring process, whether the target monitoring process exceptionally exits;
   sending, by the server, to a preset terminal when the server detects that the target monitoring process exceptionally exits, alarm information used to indicate that the target monitoring process exceptionally exits;
   receiving, from the preset terminal, an operation and maintenance instruction according to the alarm information; and
   maintaining, by the server, the target monitoring process according to the operation and maintenance instruction,
   wherein, maintaining the target monitoring process so as to prevent the target monitoring process from exceptionally exiting again due to a same reason, thereby achieving an effect of improving monitoring availability of the server.

2. The method according to claim 1, wherein, after starting a target monitoring process of a client, the method further comprises:
   determining, by the server, whether a service file of the client is updated; and
   when it is determined that the service file of the client is updated, restarting, by the server, the target monitoring process.

3. The method according to claim 1, wherein, after starting a target monitoring process of a client, the method further comprises:
   when the server detects that the target monitoring process exceptionally exits, restarting, by the server, the target monitoring process.

4. The method according to claim 1, wherein the server monitors multiple clients exchanging data with third-party servers, and the method further comprises:
   displaying, by the server, a visual management console that includes a client running monitoring interface and a client log list interface;
   displaying in the visual management console, by the server, status of the multiple clients according to corresponding target monitoring processes, wherein the status of a client comprises at least one of: a running status of the client, a load status of the client, and a log file of the client.

5. The method according to claim 1, wherein, before starting a target monitoring process of a client, the method further comprises:
   obtaining, by the server, the target monitoring process according to a processing result, wherein the processing result is obtained by processing, using a port of the client, a request of the client that is forwarded by a preset web server, and the request of the client is used to request the web server to allow the client to execute a preset event.

6. The method according to claim 5, wherein the client comprises multiple clients, and the obtaining, by the server, the target monitoring process according to a processing result comprises:
   obtaining, by the server, a target monitoring process of each client according to a processing result of each client, wherein the processing result of each client is obtained by processing, using a port of each client, a request of each client that is forwarded by the preset web server.

7. The method according to claim 1, wherein, before starting a target monitoring process of a client, the method further comprises:
   listening, by the server, to a preset port of the server, to obtain a request of the server, wherein the request of the server is used to request the client to execute a preset event;
   sending, by the server, the request of the server to a port of the client, wherein the request of the server is processed by using the port of the client, to obtain a processing result; and
   obtaining, by the server, the target monitoring process according to the processing result.

8. The method according to claim 7, wherein:
   the client comprises multiple clients;
   the sending, by the server, the request of the server to a port of the client comprises:
   distributing, by the server, the request of the server to a port of each client, wherein the request of the server is processed by using the port of each client, to obtain a processing result of each client; and
   the obtaining, by the server, the target monitoring process according to a processing result comprises:
   obtaining, by the server, a target monitoring process of each client according to the processing result of each client.

9. A monitoring apparatus of a server, comprising:
   a memory storing computer program instructions; and
   a processor coupled to the memory and, when executing the computer program instructions, configured to perform:
   starting a target monitoring process of a client, the client being configured to exchange data with a third-party server related to a specific service scenario;
   monitoring, after the target monitoring process is started, whether the target monitoring process exceptionally exits;
   sending to a preset terminal when it is detected that the target monitoring process exceptionally exits, alarm information used to indicate that the target monitoring process exceptionally exits;
   receiving, from the preset terminal, an operation and maintenance instruction according to the alarm information; and
   maintaining the target monitoring process according to the operation and maintenance instruction,
   wherein, maintaining the target monitoring process so as to prevent the target monitoring process from exceptionally exiting again due to a same reason, thereby achieving an effect of improving monitoring availability of the server.

10. The apparatus according to claim 9, wherein, after starting a target monitoring process of a client, the processor is further configured to perform:
 determining whether a service file of the client is updated; and
 when it is determined that the service file of the client is updated, restarting the target monitoring process.

11. The apparatus according to claim 9, wherein, after starting a target monitoring process of a client, the processor is further configured to perform:
 when it is detected that the target monitoring process exceptionally exits, restarting the target monitoring process.

12. The apparatus according to claim 9, wherein the server monitors multiple clients exchanging data with third-party servers, and the processor is further configured to perform:
 displaying a visual management console that includes a client running monitoring interface and a client log list interface;
 displaying, in the visual management console, status of the multiple clients according to corresponding target monitoring processes, wherein the status of a client comprises at least one of: a running status of the client, a load status of the client, and a log file of the client.

13. The apparatus according to claim 9, wherein, before starting a target monitoring process of a client, the processor is further configured to perform:
 obtaining the target monitoring process according to a processing result, wherein the processing result is obtained by processing, using a port of the client, a request of the client that is forwarded by a preset web server, and the request of the client is used to request the web server to allow the client to execute a preset event.

14. The apparatus according to claim 13, wherein the client comprises multiple clients, and the obtaining the target monitoring process according to a processing result comprises:
 obtaining a target monitoring process of each client according to a processing result of each client, wherein the processing result of each client is obtained by processing, using a port of each client, a request of each client that is forwarded by the preset web server.

15. The apparatus according to claim 9, wherein, before starting a target monitoring process of a client, the processor is further configured to perform:
 listening to a preset port of the server, to obtain a request of the server, wherein the request of the server is used to request the client to execute a preset event;
 sending the request of the server to a port of the client, wherein the request of the server is processed by using the port of the client, to obtain a processing result; and
 obtaining the target monitoring process according to the processing result.

16. The apparatus according to claim 15, wherein:
 the client comprises multiple clients;
 the sending the request of the server to a port of the client comprises:
 distributing the request of the server to a port of each client, wherein the request of the server is processed by using the port of each client, to obtain a processing result of each client; and
 the obtaining the target monitoring process according to a processing result comprises:
 obtaining a target monitoring process of each client according to the processing result of each client.

17. A non-transitory computer-readable storage medium for a server and storing computer program instructions executable by at least one processor to perform:
 a memory storing computer program instructions; and
 a processor coupled to the memory and, when executing the computer program instructions, configured to perform:
 starting a target monitoring process of a client, the client being configured to exchange data with a third-party server related to a specific service scenario;
 monitoring, after the target monitoring process is started, whether the target monitoring process exceptionally exits;
 sending to a preset terminal when it is detected that the target monitoring process exceptionally exits, alarm information used to indicate that the target monitoring process exceptionally exits;
 receiving, from the preset terminal, an operation and maintenance instruction according to the alarm information; and
 maintaining the target monitoring process according to the operation and maintenance instruction,
 wherein, maintaining the target monitoring process so as to prevent the target monitoring process from exceptionally exiting again due to a same reason, thereby achieving an effect of improving monitoring availability of the server.

18. The non-transitory computer-readable storage medium according to claim 17, further storing program instructions executable by the processor to perform, after starting a target monitoring process of a client:
 determining whether a service file of the client is updated; and
 when it is determined that the service file of the client is updated, restarting the target monitoring process.

19. The non-transitory computer-readable storage medium according to claim 17, further storing program instructions executable by the processor to perform, after starting a target monitoring process of a client:
 when it is detected that the target monitoring process exceptionally exits, restarting the target monitoring process.

20. The non-transitory computer-readable storage medium according to claim 17, further storing program instructions executable by the processor to perform:
 displaying a visual management console that includes a client running monitoring interface and a client log list interface, wherein the visual management console is configured to monitor multiple clients exchanging data;
 displaying, in the visual management console, status of the multiple clients according to corresponding target monitoring processes, wherein the status of a client comprises at least one of: a running status of the client, a load status of the client, and a log file of the client.

* * * * *